UNITED STATES PATENT OFFICE.

JOHN PRESTON, OF DORCHESTER, MASSACHUSETTS.

IMPROVEMENT IN PROCESSES OF EXTRACTING FAT-OILS FROM SEEDS.

Specification forming part of Letters Patent No. 19,918, dated April 13, 1858.

*To all whom it may concern:*

Be it known that I, JOHN PRESTON, of Dorchester, in the county of Norfolk and State of Massachusetts, have invented a new Mode of Extracting Oils and Fatty Bodies from Oleaginous Seeds and Nuts; and I do hereby declare that the same is fully described as follows.

The nature of my invention consists in or is based on the principle of engaging the other proximate principles with which the oils and fats are naturally associated in a solvent for which they exert a superior attraction.

It is a well-known fact that when oleaginous seeds and nuts are divided into flour, powder, or emulsions the vegetable proximate principles—such as mucilage, pectine, dextrine, starch, &c.—become saturated with the oils and fats, and pressure being applied with or without the aid of heat, a portion only of the oil or fat is obtained. A large part, however—often fifty parts in the hundred of the oil contained—is left in the flour and meal, and cannot be separated in the usual way. Oils which are naturally colorless are often in this way deeply colored by coloring-matter expressed with them.

My invention is founded on my discovery that the vegetable principles present in seeds and nuts may be united to other bodies, and thus lose their power of holding oil or fat connected with them. Among the vegetable substances which can be used for this purpose is sugar, as cane-sugar in its different varieties of glucose or semi-fluid sugar, and when this substance in any of its kinds is so employed the residuary matter or cake from which the oil or fat has been expressed is not injured as an article of food for man or beast.

By my process nearly all the oil or fat in most vegetable productions yielding it can be obtained. The quantity which may be left in the residuary matter is measurably under my control. This mode of controlling the quantity of fatty principle left in the marc or residue becomes very important in some manufacturing, especially when the oil or fat is valuable and where the remaining meal is improved by its removal in part. Such is the case with mustard, the kernels of the cacao, a positive advantage resulting from the removal of a part of the oil, so as to render the remaining meal less rich in fatty matter, while the oil obtained has a high value in other applications.

Although in general the several kinds of sugar are best adapted to the removal of oil from such substances as are to serve as aliments, sugar combined with hydrous starch may be successfully used in some cases, and sugar united to dextrine or gum in other cases, the application of the principle I have discovered being quite general in character.

To enable others who are skilled in the art of extracting oils and fats in whole or in part to comprehend my invention, I will proceed to describe my process as applied to the removal of a part of the fatty matter contained in the kernel or the cacao, (*Theobroma cacao,*) usually called "cocoa."

The husk or the shell of the nut, after roasting, having been removed, as usual, and the kernel having been ground to a powder, should be introduced into a kettle or mill provided with a means of heating it to about 212° Fahrenheit, and also with radial arms to act as a stirrer or compressor. After a few revolutions of the stirrer, heat having been applied, I add to the mass in the kettle from twenty to seventy per cent. of its weight of a strong sirup of sugar previously prepared, or molasses which has been boiled to remove acid, and I continue the heat and motion until the mixture is fit for the press. The water contained in the sirup of sugar, or that united with the glucose in the molasses, combines with the mucilage and dextrine of the cacao, to form with them and the sugar present a magma having so little attraction for oil or fat that the lattter exudes, and in the state of globules and mere mechanical mixture is seen diffused through the mass. When the mass is cooled, or even while hot, it may be transferred to bags and pressed, as usually is practiced for fats, in powerful presses with warm plates. The effect of thus combining the various principles of the cacao with srinpy sugar is seen in the abstraction of a nearly white and beautiful butter from the meal, the proportion to the whole quantity contained in the seed being dependent on the amount of sirupy sugar used.

The butter thus obtained contains an astringent substance, and may be used as a medicament, while the cacao cake remaining is improved for certain applications in manufacturing this article as the basis of several beverages well known, the nut being in this way made to afford two useful substances.

In treating other oleaginous seeds and nuts for confectionery or other purposes the same mode of operating by means of sugar, sirup, or molasses is adopted, and the proportion of sirup or molasses is adjusted so as to obtain either the whole or any part of the oil or fat.

What I claim as my invention for facilitating the extraction of oils or fats from oleaginous nuts or seeds is—

The employment of either molasses or a sugar sirup, under circumstances and in manner substantially as hereinbefore set forth.

In testimony whereof I have hereunto set my signature this 2d day of September, A. D. 1857.

JOHN PRESTON.

Witnesses:
R. H. EDDY,
F. P. HALE, Jr.